D. T. POLING.
NUT LOCK.
APPLICATION FILED APR. 5, 1916.
1,202,096.
Patented Oct. 24, 1916.
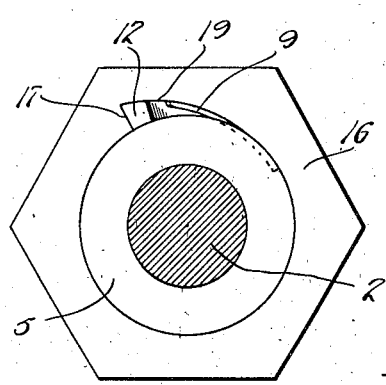
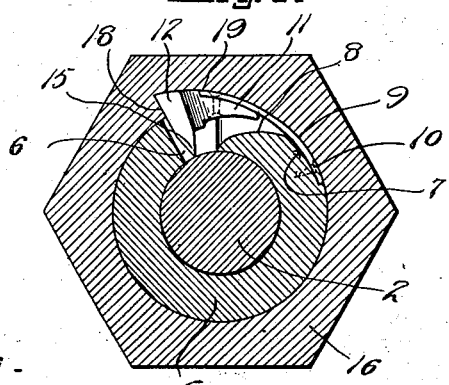
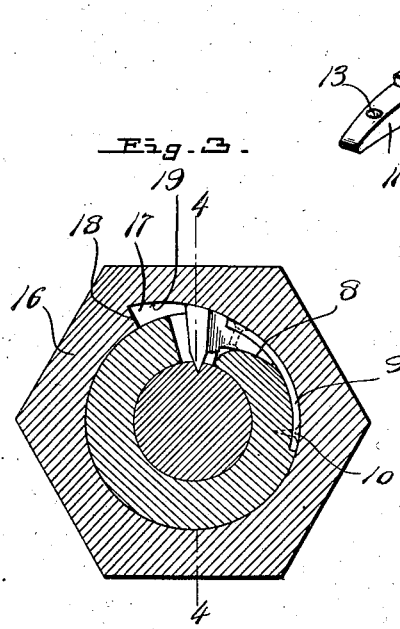
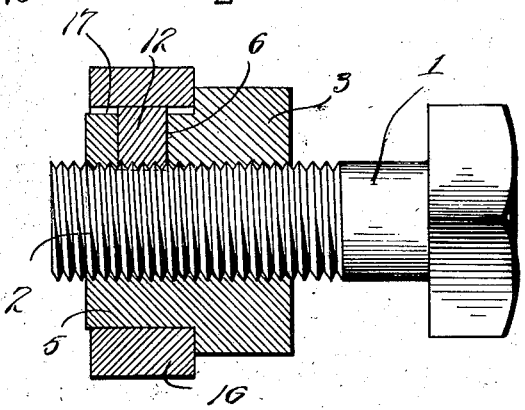
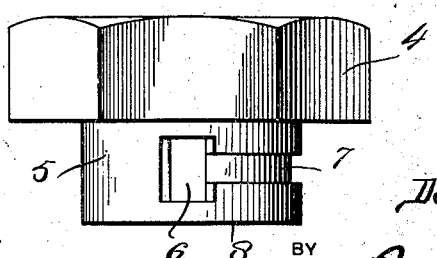
WITNESSES
INVENTOR
Dellet T. Poling.
BY
ATTORNEY

UNITED STATES PATENT OFFICE.

DELLET T. POLING, OF PHILIPPI, WEST VIRGINIA.

NUT-LOCK.

1,202,096.     Specification of Letters Patent.     Patented Oct. 24, 1916.

Application filed April 5, 1916. Serial No. 89,153.

*To all whom it may concern:*

Be it known that I, DELLET T. POLING, a citizen of the United States, residing at Philippi, in the county of Barbour and State of West Virginia, have invented certain new and useful Improvements in Nut-Locks, of which the following is a specification.

This invention relates to nut locks and more particularly to a device of this character having means whereby the nut may be effectively locked to the bolt upon which the nut is mounted.

As an object of the invention the device contemplates the provision of simple and efficient means for locking the nut to a bolt; the locking means being operated by a collar mounted upon the nut which is adapted to be turned for automatically applying or releasing the locking mechanism.

A further object of this invention is the provision of a nut lock which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is an elevation of the nut. Fig. 2 is a transverse section showing the locking mechanism in disengaged position. Fig. 3 is a similar view showing the locking mechanism in operative position. Fig. 4 is a longitudinal section on the line 4—4 of Fig. 3. Fig. 5 is a detail view of the nut, and Fig. 6 is a detail perspective view of the locking pawl.

The bolt 1 is provided with the usual threaded shank 2 upon which the nut 3 is screw threadedly mounted. The forward end of the nut 3 has, extending for about half its length, the usual hexagon wrench receiving portion 4 while the opposite end of the nut is provided with a reduced annular portion 5. A substantially square opening 6 is formed in the reduced annular portion 5 and extends radially through the reduced portion and communicates with the threaded interior of the nut. Communicating with the opening 6 and extending partially around the annular reduced portion 5 is a groove 7 which, as it enters the opening 6, increases in depth for providing an eccentric bottom wall 8 as is clearly indicated by Figs. 2 and 3 of the drawing.

A flat spring 9 has one end fastened in the groove 7 by the screw 10 while the opposite end of the flat spring 9 is fastened to the shank 11 of the operating or locking pawl 12. The shank 11 of the operating pawl is provided with an aperture 13 through which a rivet is passed for securing the end of the flat spring to the shank 11 of the locking pawl. The end of the locking pawl has a head 14, as clearly shown by Fig. 6 of the drawing, and the lower edge of the head is formed with a knife edge 15 which engages the threads of the threaded shank 3 when the device is in locked position.

Rotatably mounted on the annular reduced portion 5 is a locking collar 16 which has formed in its inner periphery the notch 17. The end wall 18 of the notch is disposed radially with respect to the center of the nut while the bottom wall of the notch is curved to provide an eccentric wall 19 against which the locking pawl bears. The tendency of the flat spring 9 is to force the locking pawl outwardly and, the locking pawl, engages the eccentric wall 19 at all times.

In operation, the nut will be adjusted until the mechanism assumes the position shown in Fig. 2 of the drawing, and it will then be screw threadedly mounted upon the shank 2. When the nut has been screwed upon the shank 2 to the desired position, the locking collar 16 will be rotated on the annular reduced portion 5 until the locking pawl 12 is, by virtue of the eccentric wall 14, forced into engagement with the threads of the shank 2 whereby the nut will be effectively locked in the desired position. For releasing the locking pawl 12 it is only necessary to rotate the locking collar 16 in the reverse direction whereupon, the spring 9 will cause the locking pawl to raise out of engagement with the threads of the shank 5.

In reduction to practice I have found that the form of my invention illustrated in the drawings and referred to in the above description, as the preferred embodiment, is the most efficient and practicable; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention as defined in the appended claims.

I claim:

1. The combination with a bolt and a nut for the bolt, the said nut having an annular reduced portion, said annular reduced portion having an opening formed therein and communicating with the interior of the nut, a locking pawl including a shank, a head formed at the end of the shank and considerably wider than the same and adapted to be disposed in the said opening, and means comprising a flat spring element having one end connected to the said shank and its opposite end connected to the said reduced portion for normally holding said head in said opening.

2. The combination with a bolt and a nut for the bolt, of an annular reduced portion formed on the nut and having an opening communicating with the interior of the nut and a groove extending partially around the said reduced portion and communicating with the said opening, the said groove being increased in depth as it enters the said opening, a locking pawl disposed in the opening and having one portion extended into the said groove, a flat spring member secured in the groove and having one end fastened to the said locking pawl, and a locking collar having its interior provided with an annular wall and a notch extending into the wall for providing an eccentric portion against which said locking pawl normally bears.

3. The combination with a bolt and a nut for the bolt, of an annular reduced portion formed on the nut, said annular reduced portion having an opening formed therein and communicating with the interior of said nut, a locking collar rotatably mounted on said reduced portion and provided with a notch having its end wall radially disposed with respect to the center of said nut, said annular reduced portion provided on its exterior with a groove, a flat spring secured in said groove, and means carried by the free end of said spring and coöperating with the notch in said locking collar for engaging said bolt when said locking collar is rotated.

4. The combination with a bolt and a nut for the bolt, of an annular reduced portion formed in the nut, said annular reduced portion having an opening formed therein and communicating with the interior of the nut, said annular reduced portion also provided with a groove extending partially around its exterior and communicating with the said opening, a flat spring secured in said groove, means carried by the free end of said spring and operating in said opening for engaging the threads of said bolt, and means rotatably mounted in said nut for engaging said first mentioned means for forcing said first mentioned means into engagement with said bolt.

5. The combination with a bolt and a nut for the bolt, of an annular reduced portion formed in the nut, said annular reduced portion having an opening formed therein and communicating with the interior of the nut, said annular reduced portion also provided with a groove extending partially around its exterior and communicating with the said opening, a flat spring secured in said groove, a locking pawl, a shank integrally formed with said locking pawl and connected to said flat spring, and a rotatably locking collar mounted upon said reduced portion and having its interior operatively engaging said locking pawl.

6. The combination with a bolt and a nut for the bolt, of an annular reduced portion formed in the nut, said annular reduced portion having an opening formed therein and communicating with the interior of the nut, said annular reduced portion also provided with a groove extending partially around its exterior and communicating with the said opening, a flat spring secured in said groove, a locking pawl, a shank integrally formed with said locking pawl and connected to said flat spring, a locking collar having its exterior formed of substantially hexagonal outline and its interior provided with an annular wall for engaging said annular reduced portion of said nut and a notch extending inwardly from said interior wall for providing an eccentric wall against which said locking pawl normally bears, said groove being formed of a greater depth at the end at which it communicates with said opening whereby the shank of said locking pawl may be received in said groove.

In testimony whereof I affix my signature in presence of two witnesses.

DELLET T. POLING.

Witnesses:
D. J. TAFT,
GEO. G. WHITE.